United States Patent [19]

Sivachenko

[11] 3,953,993

[45] May 4, 1976

[54] MULTIPLE SIZE CULVERT PIPE ROLLING MACHINE

[76] Inventor: Eugene W. Sivachenko, 6851 Waverly Manner, Redding, Calif. 96001

[22] Filed: Oct. 31, 1974

[21] Appl. No.: 519,892

[52] U.S. Cl. .................................. 72/15; 29/33 D; 29/33 P; 29/564; 72/48; 72/132
[51] Int. Cl.² ........................................ B21C 37/12
[58] Field of Search ................. 29/33 D, 564, 33 P, 29/33 T; 72/49, 50, 48, 131, 132, 14, 15; 83/94, 165

[56] References Cited
UNITED STATES PATENTS

| | | | |
|---|---|---|---|
| 2,554,555 | 5/1951 | Bissell | 72/14 |
| 3,247,692 | 4/1966 | Davis | 72/49 |
| 3,310,080 | 3/1967 | Decellier | 83/165 |
| 3,648,553 | 3/1972 | Tuschy | 83/165 |
| 3,750,439 | 8/1973 | Pratt | 72/49 |

*Primary Examiner*—C. W. Lanham
*Assistant Examiner*—E. M. Combs
*Attorney, Agent, or Firm*—Townsend and Townsend

[57] ABSTRACT

A plant for the manufacture of pipes of different diameters and lengths in which the pipe is manufactured to order and then shipped to a customer. The plant comprises a pipe-forming machine for each desired pipe diameter which forms pipe from elongate strip of sheet metal. Each such machine is fitted with a cutoff mechanism which shears the manufactured pipe to the desired length. The pipe forming machines are positioned so that the respective pipes are parallel and closely adjacent to each other. Severed pipe is discharged by a retractable pipe holding device onto a sloping pipe receiving apron which gravitationally rolls the pipe towards a collection point. At the collection point the pipe is discharged onto a stacking cage and/or a suitable transport vehicle such as a railroad car. Control means is operatively coupled with the pipe forming machine, the cutoff means and the pipe holding device so that a single operator can select and sequence the manufacture and discharge of pipe to fill any given customer's order and to optimize pipe stacking and nesting so that the required shipping space for the pipe is minimized.

23 Claims, 7 Drawing Figures

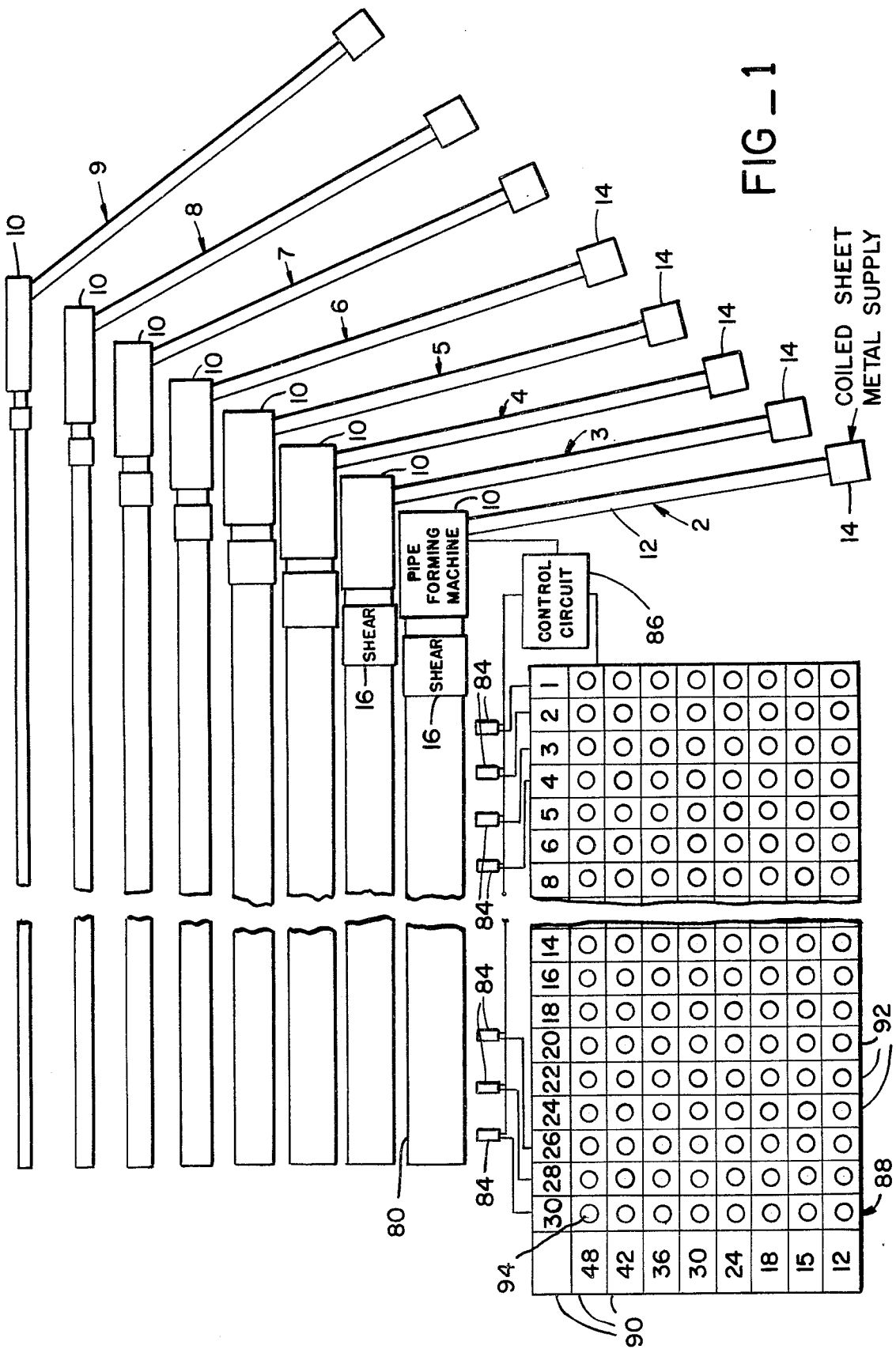
FIG_1

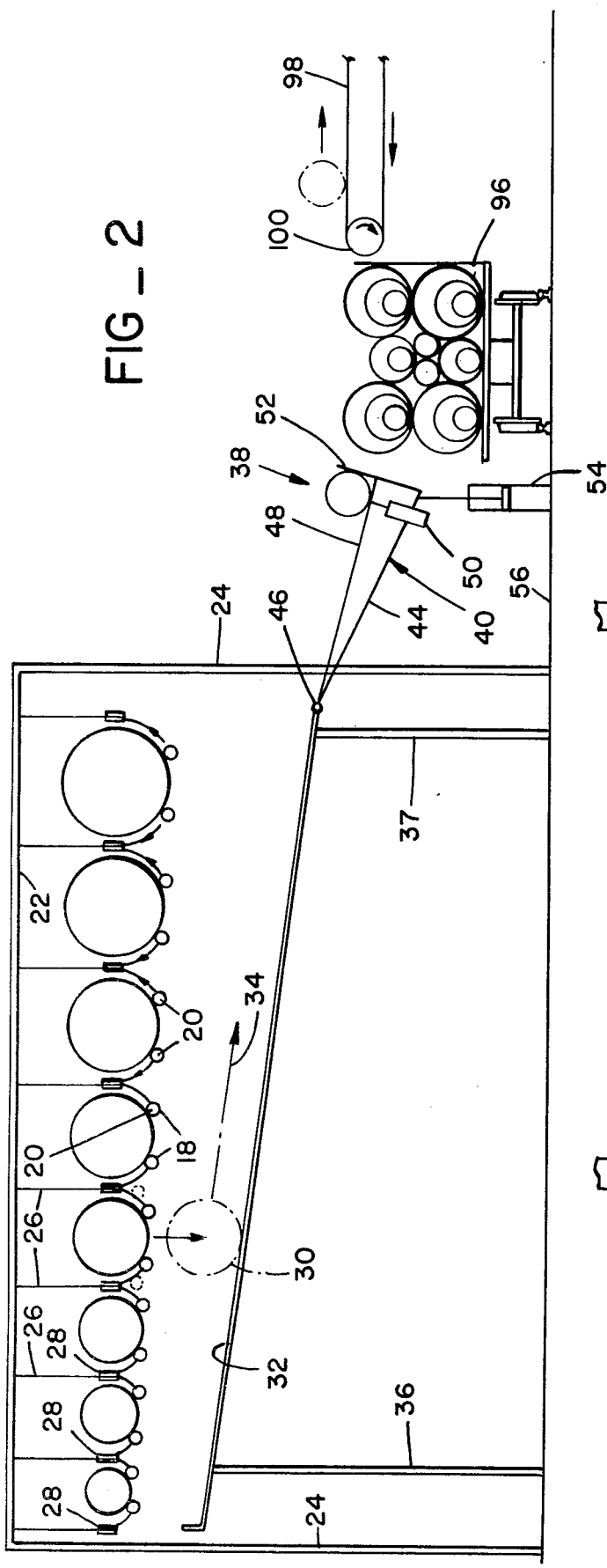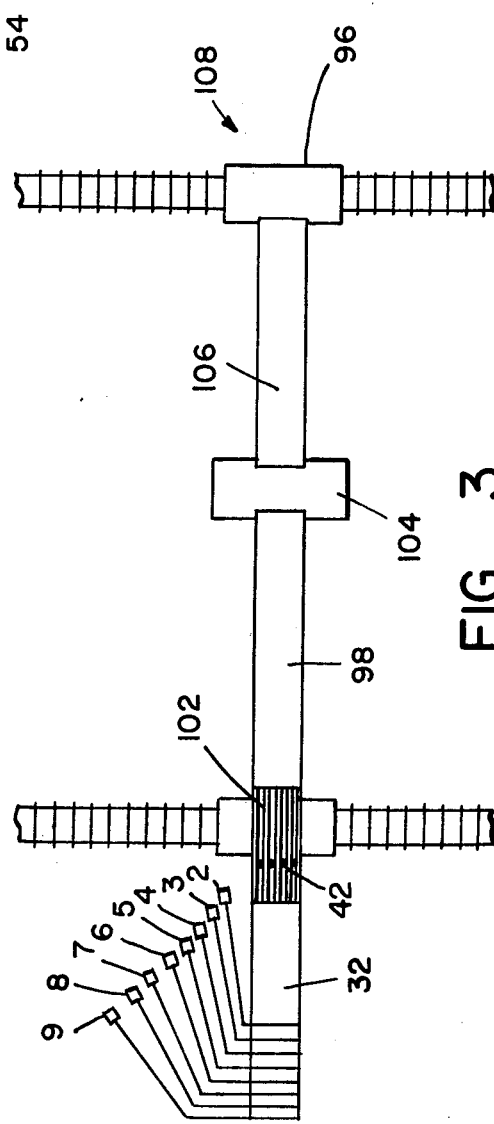

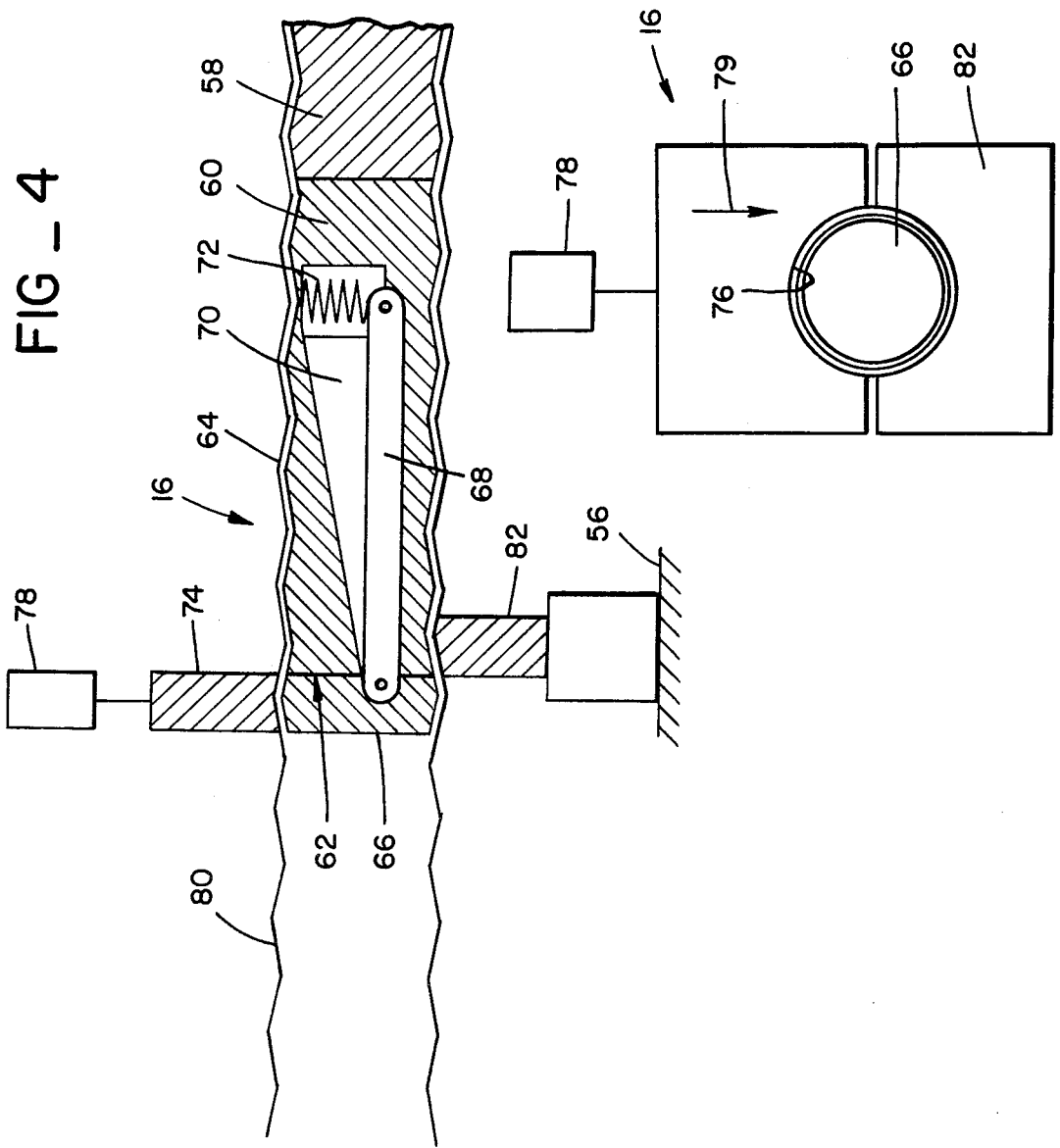

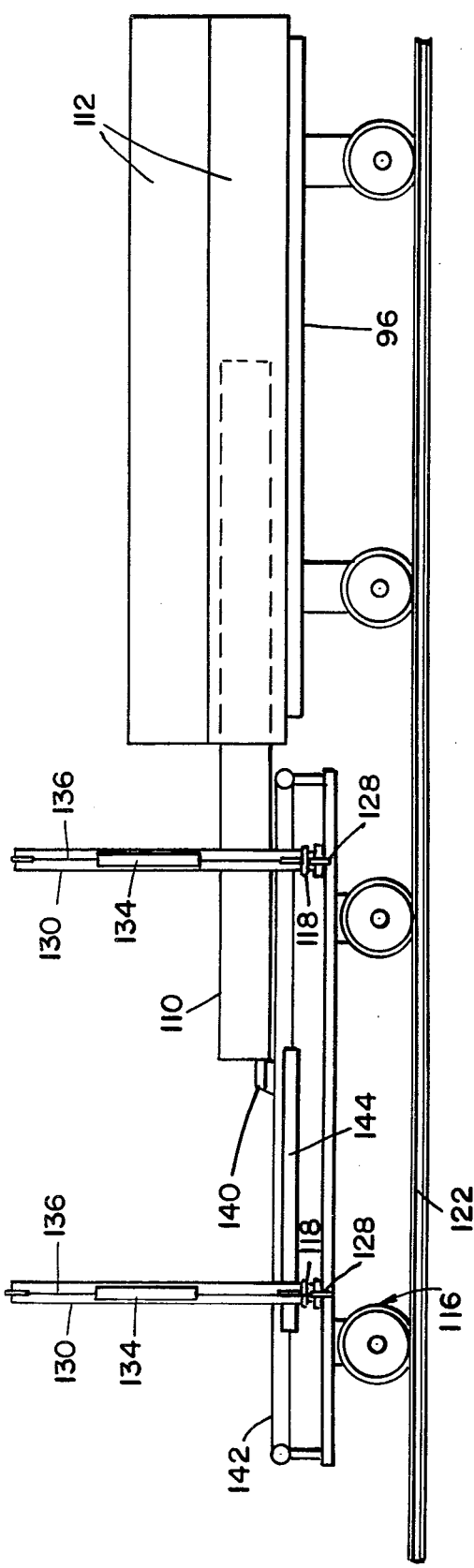
FIG_6
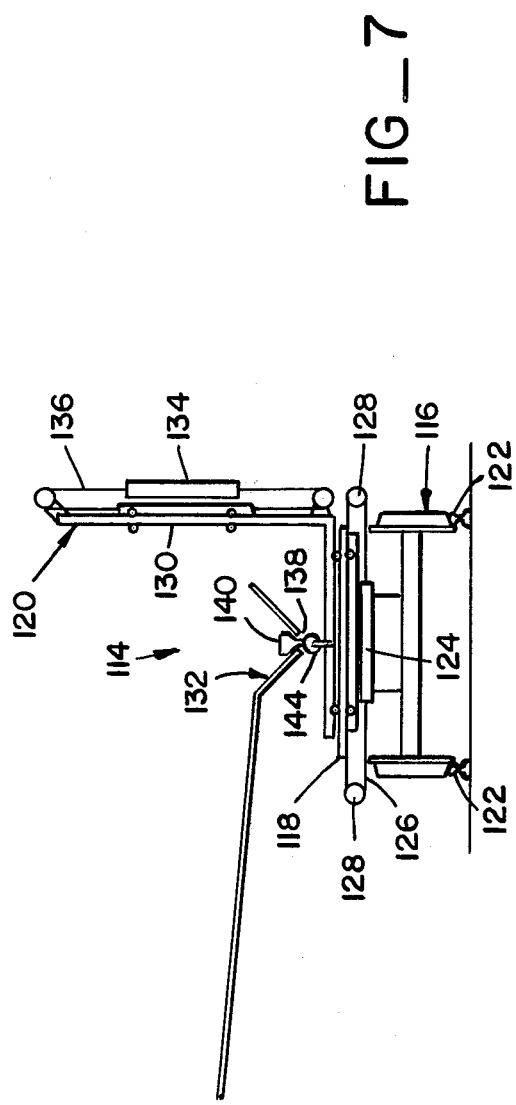
FIG_7

MULTIPLE SIZE CULVERT PIPE ROLLING MACHINE

BACKGROUND OF THE INVENTION

The present invention generally relates to the manufacture of pipe, and particularly of culvert or corrugated pipe, on an economic basis to minimize or eliminate pipe handling and storage or inventory costs while providing the customer with service.

In the past pipe, and particularly culvert pipe was spirally wound on one or a few helical pipe forming machines installed in a plant. U.S. Pat. No. 3,247,692 describes an exemplary pipe making machine which is presently in use. Such machines receive pipe forming devices which engage an elongate strip of corrugated metal and helically wind the strip to form the pipe. A separate forming device is required for each pipe diameter, and it was customary to run the machine for a period of time to produce an inventory of pipe of a given diameter. Thereafter the machine is changed over for the production of another pipe diameter by replacing the forming device with another forming device dimensioned to produce pipe of such other diameter.

The changeover is time consuming and represents machine and plant down-time which is expensive and adds to the cost of the pipe. Moreover, the changeover requires a precise alignment of parts which in turn necessitates highly skilled labor. Inaccuracies in the alignment could result in the production of pipe which exceeds the permissible tolerance and which must, therefore, be rejected. Furthermore, misalignments frequently cause disproportionate wear and tear of parts of the forming device which in turn requires premature and costly replacement of such parts.

In addition to the relatively large operating expenses conventional plants require that a substantial pipe inventory be kept on hand so that customers can be efficiently served. The inventory must be stockpiled with at least the most popular pipe sizes and pipe lengths. Since each pipe diameter must be stocked in a plurality of lengths the overall inventory is large and represents a substantial capital investment. Furthermore, the stocking, maintaining, and use of the inventory requires the multiple handling equipment such as cranes, fork lifts, transportation vehicles and the like. In sum, therefore, the costs of manufacturing pipe along conventional lines were significantly increased by the need for frequent pipe forming machine changeovers, the need for highly skilled labor to effect such changeovers, capital investments in large inventories and capital investments in the necessary labor and equipment to service such inventories.

SUMMARY OF THE INVENTION

The present invention provides a system and method in which the manufacture and delivery of pipe to a customer's specification is fully integrated. The invention employs multiple pipe forming machines to eliminate the changeover of a machine for the manufacture of differing pipe diameters. The selection of the diameter and length of pipe being manufactured is determined by the customer's specific order. Thus, pipe is made "to order" for immediate shipment. The need for carrying inventories has thereby been all but eliminated to eliminate the large capital investment in inventories and inventory handling equipment and labor. As a consequence, the present invention substantially reduces the cost of manufacturing and delivering pipe.

In its broadest aspects, the present invention contemplates a pipe manufacturing plant or system which comprises a plurality of individual, closely adjacent pipe forming machines. The machines are positioned so that the finished pipes are in close proximity and substantially parallel to each other. Each machine includes pipe severing means coupled to pipe length sensing means and cooperating with suitable pipe length selection means for severing pipe of the desired length. Severed pipe is then gravitationally dropped downwardly onto a pipe receiving apron which is inclined so that pipe rolls gravitationally to a pipe collection point. At the collection point the pipe is discharged onto a stacking and/or nesting device and a pipe transport vehicle for shipment of the pipe to the customer or, alternatively, the pipe is further treated as by dipping it in a galvanizing bath, an asphalt or plastic coating bath or the like. After removal of the pipe from the treatment bath, it is transported to a further collection point for stacking and/or shipment in the earlier described manner.

Although a plant constructed in accordance with the present invention requires a relatively greater capital investment in pipe forming machines, several factors greatly reduce the impact of such additional capital requirement. Furthermore, as a consequence of the elimination of many of the heretofor required capital investments and operating costs, as above described, pipe can be manufactured substantially more economically in accordance with the present invention as compared to the prior art.

It is particularly advantageous for the present invention to employ pipe forming machines constructed in accordance with U.S. Pat. No. 3,750,439 for METHOD AND APPARATUS FOR MAKING CORRUGATED PIPE the disclosure and drawings of which are incorporated herein by reference. Such pipe forming machines, and particularly the metal strip corrugating, feeding and helically forming portions thereof are relatively inexpensive both in terms of their initial costs and in terms of their operating and maintenance costs due to the improvements described in that patent. Capital requirements for the construction of the multiple pipe manufacturing plant of the present invention are thereby reduced as compared to other prior art pipe forming machines.

Furthermore, the present invention eliminates or at least greatly reduces the need for expensive pipe handling equipment, such as cranes, forklifts, and trucks for the transfer of pipe from the pipe making machine to the pipe inventory. Instead, the present invention employs gravity to transfer the pipe from the pipe making machine to the point at which the pipe is stacked for shipment except in those instances in which the pipe is dipped prior to shipment.

To further enhance the economy of the plant of the present invention a given length of pipe is severed from the pipe being manufactured by a pipe shear rather than the heretofore common pipe saw or friction cutoff device either one of which caused burrs which had to be removed before shipment of the pipe to the customer. Such deburring is both time-consuming and expensive since it requires almost exclusively hand labor. The shear employed by the present invention has simultaneously actuated interior and exterior shear dies which cooperate with a central mandrel over which the pipe is manufactured. The shear is stationary to simplify its construction and pipe of differing lengths is made by providing sensors, such as photo-sensors downstream of the shear, which signal the length of the pipe between the shear and the sensor. Suitable control means is provided to activate the shear when the desired pipe length is attained.

A still further economizing aspect of the present invention is obtained from the provision of a central control panel from which a single operator can independently activate any one of the pipe forming machines and select the length of the pipe finally severed for discharge to the collection point. Aside from the labor savings afforded by this aspect of the invention it enables the manufacture of pipe in the sequence in which it is to be stacked. Thus, pipe of stacking diameters can be manufactured to fill a given customer's order so that the finally stacked pipe occupies the least shipping space while permitting a continuous, uninterrupted pipe manufacture.

Another aspect of the present invention is directed towards the nesting of pipe, that is placing smaller diameter lengths of pipe inside larger diameter lengths for shipment of such pipes in the smallest possible shipping space to thereby reduce shipping cost. In this regard the present invention provides means for receiving the smaller diameter pipe, for axially aligning it with the larger diameter pipe on a suitable shipping vehicle, say a railroad car, in both the horizontal and vertical directions and for thereafter axially advancing the smaller pipe until it is nested within the larger pipe. These means comprise high speed, double acting air cylinders suitably mounted on a flatbed railroad car, for example, and enable the nesting of pipe without the heretofore necessary forklifts which were employed for that purpose and which made such pipe nesting cumbersome, time-consuming, and therefore, relatively expensive.

It can therefore be seen that the present invention not only simplifies pipe manufacture per se, by for example, eliminating the heretofore necessary changeover of a pipe forming machine from one pipe diameter to another diameter, but it also effectively automates pipe manufacture by streamlining the manufacture into a continuous flow of pipe of the sizes and diameters required to fill a given customer's order. This flow of pipe is a flow of custom-made pipe which short-circuits the need for pipe inventory and handling equipment. Thus, the present invention is a significant improvement over prior art pipe manufacturing systems and methods.

BRIEF DESCRIPTION OF THE DRAWINGS

FIG. 1 is a schematic plan view of a pipe manufacturing plant constructed in accordance with the present invention and specifically illustrates the arrangement of the pipe forming machine, the pipe severing shear and the control means therefor;

FIG. 2 is a schematic side elevational view of the plant illustrated in FIG. 1 and shows the manner in which finished manufactured pipe is transferred to a shipping point;

FIG. 3 is a schematic plan view similar to FIG. 1 but illustrates the interposition of a pipe dipping tank for applications in which the pipe surface must be treated;

FIG. 4 is a side elevational view, in section of the pipe shear employed in connection with the pipe forming machines of the present invention;

FIG. 5 is a front elevational view of the shear illustrated in FIG. 4; and

FIG. 6 is a schematic side elevation of view of the railroad car shown in end view in FIG. 2 and illustrates the pipe nesting means of the present invention; and FIG. 7 is an end view of the pipe nesting mechanism shown in FIG. 6.

DESCRIPTION OF THE PREFERRED EMBODIMENTS

Referring first to FIGS. 1 and 2, a pipe manufacturing plant constructed in accordance with the present invention comprises a plurality of pipe forming machines 2 through 9 each having a pipe forming device 10, preferably constructed in accordance with the above referenced U.S. Pat. No. 3,750,439, for helically deforming an elongate, corrugated strip of metal 12. A coiled supply of sheetmetal 14 of the appropriate width and thickness is provided for each pipe forming machine. As is fully described in the above referenced U.S. Patent the flat sheetmetal is advanced toward the pipe forming device past sheet metal corrugating rollers (not shown in the drawings) prior to the helical winding of the corrugated sheet. The pipe forming device 10 includes means joining the edges of the helically deformed strip to finish form the cylindrical pipe as is fully disclosed in said patent.

Finish formed, cylindrical pipe, in the illustrated example corrugated or culvert pipe, continuously issues from the pipe forming device 10 and advances horizontally towards the left, as seen in FIG. 1, past a pipe cutoff shear 16. The issuing pipe rotates about its axis and simultaneously advances parallel to its axis as it is manufactured. A plurality of support rollers 18 are provided to support the pipe in its horizontal inclination in axial alignment with its pipe rolling device. The support rollers are rotatable about their axes 20 which are generally parallel to the pipe axis and carried by a suitable support structure such as a horizontal beam 22 carried by upright posts 24 and a plurality of hangers 26 depending from the beam.

Retracting mechanisms 28 are provided for linearly or pivotally moving the support rollers for a given pipe away from the pipe so that the pipe normally supported by such rollers can gravitationally drop downwardly as illustrated at 30 in FIG. 2. The detailed construction of such retracting mechanisms is well known in the art and, therefore, not further described herein. Suffice is to say that the retracting mechanisms are constructed so that the left and right hand rollers for each pipe are simultaneously retracted and returned to their supporting position upon receipt of a suitable activating signal as is more fully described hereinafter.

Disposed beneath the pipe support rollers is a pipe receiving and transfer surface or apron 32 which slopes downwardly in a direction perpendicular to the pipe axes so that pipe dropping onto the apron rolls gravitationally downward in the direction indicated by arrow 34 in FIG. 2. The apron is carried upright posts 36, 37 and the surface itself is defined by continuous sheet metal by support beams or rails running in the direction of the slope of the surface, or the like.

A lower end of the pipe receiving surface forms a pipe collection point 38 and is defined by a movable preferably pivotally mounted end member 40. The end member has an L-shaped configuration, and is pivotable about a horizontal axis 46 defined by an upright barrier 42 and elongate trusses 44 rigidly secured to the barrier. The barrier preferably comprises a plurality of rigid beams or posts which are horizontally spaced apart. A plurality of transfer rails 48 protrude through open spaces between adjacent barrier beams, are pivotable relative to the trusses 44 and the apron 32 about pivot axis 46 and are movable about the pivot axis in a generally vertical direction with a mechanic or hydraulic actuator 50 secured to the trusses adjacent the barriers. Thus, upon energization of actuator 50 the transfer rails can be raised or lowered relative to an uppermost end 52 of the barrier. Another pneumatic, hydraulic, or mechanical actuator 54 is mounted on floor 56 and connected to the end of trusses 44 opposite pivot axis 46 for raising or lowering the free end of end member 40.

When the transfer rails 48 are lower than the upper end 52 of barrier of 42, a pipe which gravitationally rolls down apron 32 is arrested and held. To discharge such a pipe actuator 50 is energized to raise the transfer rails with respect to the barrier until the rails clear the upper barrier ends and the pipe can roll past the barrier. By suitably raising or lowering actuator 54 of the relative elevation at which the pipe is discharged can be adjusted for purposes described hereinafter.

Referring now briefly to FIGS. 4 and 5, it is preferred that a shear 16 constructed as described hereinafter be provided for each pipe forming machine. Such a shear cooperates with a mandrel 58 which extends past the pipe forming device 10 (shown in FIG. 1 only) so that pipe rotates about and longitudinally advances over the mandrel as it is formed. The free end of the mandrel mounts a shear block 60, the front end of which defines a shear plane 62 along which a length of pipe 64 is severed. A disc shaped interior die 66 abutts shear plan 62 and is pivotally connected to an elongate lever 68 which protrudes in an axial direction into a cavity 70 in shear block 60. The cavity opens inwardly and upwardly, as viewed in FIG. 4, and a compression spring 72 at the inner end of the cavity engages the inner end of the lever and biases the lever in a downward, horizontal position as illustrated in FIG. 4. When the lever is in its horizontal position interior die 66 is in alignment with shear block 60.

An exterior die 74 is in planar alignment with interior die 66 and has a semi-circular cutting edge 76 which rests against the exterior of pipe 64. An actuating mechanism 78 such as a hydraulic actuator is provided for applying a downward force to the exterior die in the direction of arrow 79. This movement is also imparted to interior die 66 whereby the semi-circular cutting edge 76 of the exterior die 74 and the lower half of interior die 66 shear off a length of pipe 80 along shear plane 62. An anvil 82 is disposed beneath shear block 60 and supported on floor 56 to define a shearing edge which cooperates with the lower half of interior die 66. Thus, as actuator 78 forces exterior die 74 downwardly, the upper half of pipe 60 is severed along the shear plane. Simultaneously therewith the downward movement of the exterior die is translated to a like downward movement of the interior die which thereby severs the lower half of the pipe. The cutoff edges of pipe length 80 are clean shears free of burrs commonly encountered when severing length of pipe with conventional saws and the like.

During the downward movement of interior die 66 lever 68 is pivoted in a counterclockwise direction, as viewed in FIG. 4 and thereby compresses spring 72. Upon retraction of the exterior die 74 the force exerted by the compression spring pivots the lever 68 in clockwise direction, again as viewed in FIG. 4, until interior die 66 is in alignment with shear block 60. The length of pipe is now free to drop downwardly upon the opening of support rollers 18 (not shown in FIGS. 4 and 5). Normally, the dropping pipe readily disengages from the interior die by pivoting about a horizontal axis and first disengaging the upper half of the die. However, to insure that the interior die is not moved in an axial direction, suitable holding means, such as a groove and tongue arrangement, for example, are provided to positively retain the interior die to the shear block. The detailed construction of such retaining means is well known and therefore not further illustrated herein.

Referring again to FIGS. 1 and 2, each shear 16 described above is stationarily mounted with respect to the corresponding pipe forming machine. The length of pipe 80 severed from the remainder of the pipe is varied by permitting more or less pipe to issue past the shear before the length is severed. In a preferred embodiment of the invention sensors 84, such as optical sensors, are provided at predetermined intervals, say at one foot intervals from the shear plane of shear 16. The sensors are electrically connected with the shear and the corresponding pipe forming device via a control circuit 86 and they are further wired to selection panel 88 which has a plurality of horizontal rows 90 which correspond to the plurality of pipe forming machines 2 through 9, and a plurality of columns 92 which correspond to the plurality of length sensors 84. In each converging row-column square is an actuating button 94 coupled with the control circuit 86 for the corresponding pipe forming machine, say machine 2 illustrated in FIG. 1, and a corresponding length sensor. Upon depression of a given actuating button 94, say the first button in the uppermost row of control panel 88, the pipe rolling machine is energized via control circuit 86. Finished pipe rotates and moves axially to the left as viewed in FIG. 1, until its free end reaches the length sensor 84 corresponding to the depressed button in the stated example the last length sensor so that the pipe between this sensor and the shear plane of shear 16 has a length of 30 feet. When the sensor detects the free pipe a signal is transmitted from the sensor to control circuit 86 which deactivates the pipe forming device 10 of the pipe forming machine 2 and simultaneously activates shear 16 by energizing actuator 78 (shown in FIGS. 4 and 5 only).

As soon as the shear has completed its shearing cycle the now severed length of pipe 80 can be dropped by retracting pipe support rollers 18 in the above described manner. The retraction of the support rollers can be automatic, as by providing a delayed retraction response to the receipt of a signal from the selected length sensor via control circuit 86 or the retraction can be manually operated by providing suitable actuating switches (not separately shown), which are activated by the plant operator when he wishes to transfer the severed length of pipe to the collection point 38.

When the support rollers are retracted the just manufactured pipe drops onto apron 32 and rolls to the collection point 38. There its movement is arrested and the pipe is held until the transfer rails 48 are raised so that the pipe can drop over the upper end 52 of barrier 42 onto a suitable stacking device or a transport vehicle such as a railroad car 96 illustrated in FIG. 2. It will be observed that end member 40 of apron 32 permits a substantially impact free loading of the railroad car because the end member can be raised or lowered as desired.

Thus, it is apparent that the present invention enables a custom manufacture of pipe for immediate shipment. In addition, since each of the pipe forming machines 2 through 9 (or more if desired) is independently operable by a single operator via control panel 88 pipe of differing diameters, if ordered by a given customer, can be sequentially manufactured and loaded on railroad car 96 so that a stacking of pipe is possible to efficiently utilize the available shipping space.

By stacking is meant the placement of pipes of differing diameters so that void spaces between adjacent pipes of a given diameter are filled by pipes of a smaller diameter as is visually illustrated in FIG. 2.

Referring now to FIGS. 2, 6 and 7, the present invention also provides means for nesting pipes, that is for placing smaller diameter pipe 110 inside larger diameter pipe 112 to thereby minimize the required shipping space for the pipe. To effect nesting, relatively large diameter pipe is first stacked on railroad car 96 as described above. Thereafter the railroad car is advanced, to the right, as viewed in FIG. 6, so that smaller diameter pipe lengths 110 can be received by a nesting mechanism 114, preferably mounted on a flatbed railroad car 116 or the like, which is positioned at pipe collection point 38.

The nesting mechanism comprises a horizontal track 118 mounted to the bed of railroad car 116. A generally L-shaped support is horizontally movable along track 118 in a direction perpendicular to rails 122 and is actuated by a suitable reciprocating mechanism such as a pneumatic cylinder 124 which reciprocates a cable 126 looped over rollers 128 and secured to the L-shaped support so that the latter reciprocates horizontally back and forth over track 118 when the cylinder is actuated.

The vertical leg 130 of the L-shaped support mounts a V- or trough-shaped guide 132 for lengths of pipe (not shown in FIG. 7) and permits the guide to move in a vertical direction along the legs. The back side of the legs mounts another pneumatic actuator 134 for raising or lowering the guide via a cable 136. Thus, by suitably actuating pneumatic cylinders 124 and 134 pipe guide 132 can be axially aligned with any one of the stacked pipes 112 on railroad car 96.

The V-shaped pipe guide 132 has an open bottom 138 through which a paddle or pusher 140 extends. The lower end of the pusher is fastened to a cable 142 which in turn is longitudinally reciprocated by an elongate pneumatic actuator 144. Thus, when a small diameter pipe 110 (not shown in FIG. 7) is placed in pipe guide 132 and the latter is aligned with a large diameter pipe 112 on railroad car 96, energization of pneumatic actuator 144 drives paddle 140 forward, that is to the right as viewed in FIG. 6, to nest, i.e., to place the small diameter pipe within the stacked large diameter pipe on the railroad car. In this manner, loading can be accomplished in a fast and efficient manner without cumbersome handling of the pipe to be nested with handling equipment, such as forklifts or cranes, which are illadapted to effect a nesting of different diameter pipes.

Referring to FIG. 1 through 3, pipe, and especially culvert pipe must frequently be surface treated, say, galvanized or hot asphalt-dipped or both before the pipe is shipped. For this purpose a horizontal conveyor 98 is provided. An upstream end 100 of the conveyor is positioned on the side of railroad car 96 opposite from barrier 42 and a suitable, demountable bridge 102, schematically illustrated only, communicates the forward end 100 of the conveyor transfer rail 48 so that pipe can roll onto the conveyor when the transfer rails extend above upper barrier end 52. Pipe on conveyor 98 is then discharged into one or more pipe dipping tanks 104 (one tank only is shown in FIG. 3) to treat and/or coat the pipe as desired. Thereafter the pipe is placed on a second conveyor 106 for loading the coated and/or surface treated pipe on a railroad car or the like at 108 in the above-described manner.

From the foregoing description it will be apparent that each pipe forming machine is fitted with a pipe forming device 10 a coiled sheet metal supply 14, a shear 16 and length sensing and shear actuating means. The exact construction of the component such as the pipe forming machine, the shear, the retractable support rollers, the pipe receiving apron, etc. can of course be varied to suit particular needs and applications. Additionally, in a given application it might be advantageous to replace the sloping apron with a horizontal power-driven pipe conveying belt or the like. Such a construction is economically feasible because only a single conveyor would be needed to service all pipe forming machines.

I claim:

1. A system for the manufacture of pipe of varying diameters and lengths comprising in combination a plurality of machines for forming pipes of a like plurality of differing diameters, support means receiving each pipe as it is manufactured and for supporting it, means for severing the manufactured pipe to a desired length while the pipe is on the support means, control means operatively coupled with the machines and with the severing means permitting an operator to selectively and independently activate any one of the machines and to activate the corresponding severing means for severing pipe of the desired length, means for discharging the severed pipe from the support means, pipe transport means for receiving the discharged pipe and for passing it to a collection point, and means for stacking pipe as it arrives at the collection point.

2. A system according to claim 1 wherein the severing means comprises a shear, pipe end sensing means spaced from the respective pipe forming machines at pre-selected intervals, and means operatively coupled to control means, to the sensing means and to the shear for actuating the the shear in response to the presence of an end of pipe at a pre-selected one of the sensing means.

3. A system according to claim 1 wherein the discharging means comprises means for retracting the pipe support means for gravitationally dropping the pipe carried by such support means, and wherein the pipe transport means is disposed beneath the support means for receiving such gravitationally dropping pipe.

4. A system according to claim 3 wherein the support means comprises a plurality of rollers rotatable about axes substantially parallel to the axis of the pipe being formed, the rollers being spaced over the length of the pipe being formed, and wherein the retracting means comprises means for withdrawing the rollers with respect to each other so that pipe supported by such rollers can drop downwardly between the retracted rollers.

5. A system according to claim 1 wherein the pipe forming machines advance freshly made pipe axially and parallel and relatively closely adjacent to each other, and wherein the pipe transport means defines a sloped surface positioned beneath the discharging means for gravitationally rolling such received pipe along the sloped surface to the collection point.

6. A pipe manufacturing system for selectively making pipe of differing diameters and lengths and for stacking such pipe in a form ready for shipment comprising: a plurality of adjacent pipe forming machines, each machine including means for helically rolling an elongate strip of sheet metal into a cylindrical form, means for joining the helically wound strip along its edges to form a finished pipe, the sheetmetal rolling means of each machine being positioned so that finished pipe from each machine issues parallel to pipe issuing from the other machines, means for engaging and supporting finished pipe issuing from the machine in a substantially horizontal position, means for laterally retracting the supporting means for the pipe to permit pipe to gravitationally drop in a downward direction, means for severing a length of pipe, and means for selecting and varying the length of severed pipe, the system further comprising means defining a downwardly sloping surface disposed beneath the finished pipe support means for receiving the downwardly dropping pipe and for gravitationally rolling such pipe to a collection point, barrier means at the collection point for holding pipe arriving at the point from the sloping surface, and means for selectively discharging the pipe from the collection point.

7. A system according to claim 6 including pipe-transport means positioned for receiving pipe discharged at the collection point, a tank for submerging the pipe in a liquid positioned for receiving pipe from the transport means, end means for removing pipe from the tank and for transferring such pipe to a shipping point.

8. A system according to claim 6 wherein the severing means comprises a shear for severing pipe of the desired length, the shear comprising a pair of independent shear dies, one of the dies being disposed exteriorly of the pipe and the other of the dies being disposed interiorly thereof, a mandrel disposed interiorly of the pipe and positioned for receiving the pipe as it is finish formed, and means for simultaneously moving the shearing dies relative to and past the mandrel to thereby shear off the desired length of pipe.

9. A system according to claim 8 including means for automatically retracting the shear dies into alignment with the mandrel so that additional length of pipe can pass over the dies for the subsequent shearing of another length of pipe.

10. A system according to claim 6 including means for selectively actuating any one of the pipe forming machines, and means operatively connected with the severing means for deactivating the respective pipe rolling and joining means in response to formation of the desired length of pipe and for thereafter actuating the severing means.

11. A system according to claim 6 wherein the barrier means comprises a generally vertically oriented member protruding substantially perpendicularly from a lowermost end of the sloping surface, and wherein the retracting means comprises power-driven means for sufficiently raising the pipe relative to the barrier means to permit the pipe at the collection point to roll past the barrier means.

12. A pipe manufacturing plant capable of supplying corrugated pipe of multiple diameters in a plurality of preselected lengths and for substantially instantaneously shipping pipe of any desired diameter and length to customers without the need for carrying a pipe inventory, the plant comprising:
a plurality of helical corrugated pipe forming machines, each machine comprising means storing a length of flat sheet metal, a helical pipe forming apparatus, means for advancing the sheet metal to the apparatus and for corrugating the sheet metal prior to its arrival at the apparatus, and means for joining edges of the helically deformed sheet metal to thereby form closed, cylindrical pipe,
means for sensing the length of pipe between the apparatus and a free-end of the finished cylindrical pipe,
retractable support means for supporting finished pipe in a substantially horizontal position and for selectively withdrawing such support so that pipe can be gravitationally discharged in a downward direction upon the withdrawl of the support means,
a pipe cut-off shear for substantially burr-free severing a length of pipe from the pipe issuing from the apparatus,
means operatively coupled with the shear and the sensing means for activating the shear to thereby sever pipe of a preselected length,
means defining a pipe receiving surface beneath the retractable support means,
means defining a pipe collection point,
means for transporting pipe received by the pipe receiving means to the collection point, and
means for stacking pipe for shipment to the customer, the stacking means being positioned at the collection point,
whereby pipes of the desired diameters and length can be sequentially manufactured for nesting and stacking immediately prior to shipment of such pipe to the customer.

13. A plant according to claim 12 wherein the shear is stationary relative to the associated pipe forming apparatus, wherein the length measuring means comprises a plurality of sensors spaced along the retractable pipe support means, and wherein the activating means actuates the shear in response to the arrival of a free pipe end at a predetermined sensor.

14. A plant according to claim 13 including a control panel, means operatively coupled with the pipe forming apparatus for selectively actuating any one of the apparatus for selectively forming pipe of different diameters, and means operatively coupled with the sensors, the shear and the corresponding apparatus for deactivating the corresponding apparatus in response to the formation of pipe of the desired length, for thereafter actuating the shear to sever such pipe and for subsequently retracting the support means to effect the transfer of the severed pipe onto the pipe receiving means and hence the collection point and the stacking means.

15. A plant according to claim 12 including means between the pipe receiving means and the stacking means for coating the pipe prior to stacking and shipment.

16. A plant according to claim 12 including nesting means for placing smaller diameter pipe inside stacked, relatively larger diameter pipe, the nesting means including first means for axially aligning the smaller diameter pipe with relatively larger diameter pipe, and second means for axially advancing the thus aligned smaller pipe relative to the first means into nesting relationship with the stacked larger diameter pipe.

17. A plant according to claim 16 wherein the relatively larger diameter pipe is stacked on a vehicle, and wherein the nesting means is mounted on another vehicle.

18. A plant according to claim 16 wherein the means for aligning the smaller diameter pipe comprises means for independently moving the smaller diameter pipe in horizontal and verticle directions which are substantially perpendicular to an axis of the pipe.

19. A plant according to claim 18 wherein the axial advancing means comprises a guide supporting the smaller diameter pipe and permitting axial movement thereof, pushing means for engaging an end of the smaller diameter pipe on the guide and for advancing the pipe in an axial direction, and power-driven means operatively coupled to the pushing means for reciprocating the pushing means parallel to the guide.

20. A method of manufacturing and shipping cylindrical pipe of varying diameters and length to a customer without storing an inventory of such pipe comprising the steps of forming from a strip of sheet metal each pipe of the desired diameter and of the desired length in the order it is to be shipped on a plurality of adjacent continuous pipe forming machines, the forming step including the step of successively forming pipe of differing diameters, severing the desired length of the pipe of the desired diameter, gravitationally transporting the severed pipe to a collection point, and discharging pipe from the collection point onto a transport vehicle for substantially immediate shipment of such pipe to the customer.

21. A method according to claim 20 wherein a single operator selects the manufacturing sequence of the desired pipe diameters and lengths by actuating corresponding actuating means for the pipe forming machines and for a pipe shear to effect the severing step.

22. A method according to claim 20 including the step of successively making pipe of smaller diameters, and nesting smaller diameter pipe within larger diameter pipe by positioning the smaller diameter pipe in alignment with the larger diameter pipe and axially advancing the smaller diameter pipe into nesting relationship with the larger diameter pipe.

23. A method according to claim 22 including the step of stacking the larger diameter pipe before nesting the smaller diameter pipe therein, and including the step of moving the smaller diameter pipe perpendicular to its axis in generally horizontal and vertical directions to thereby align it with the larger diameter pipe.

* * * * *